(No Model.) 5 Sheets—Sheet 1.
P. INCH.
PROCESS OF AND MACHINE FOR MAKING MANTLES OR HOODS FOR INCANDESCENT GAS LIGHTS.
No. 571,372. Patented Nov. 17, 1896.
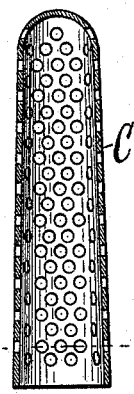
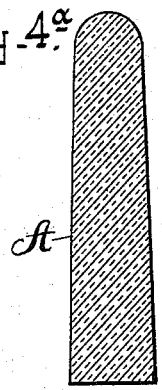
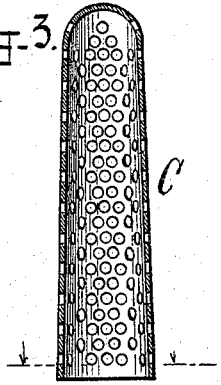
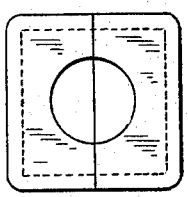
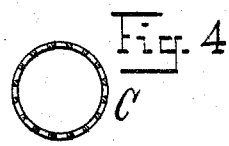
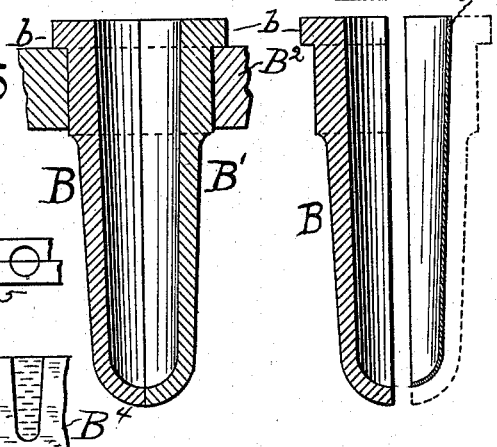
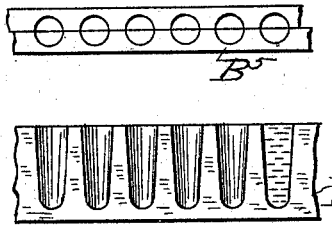
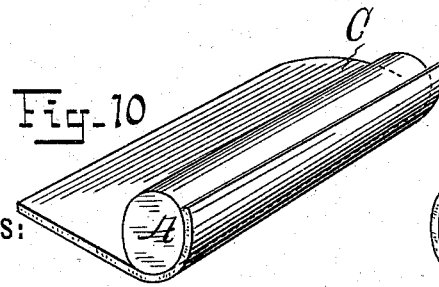
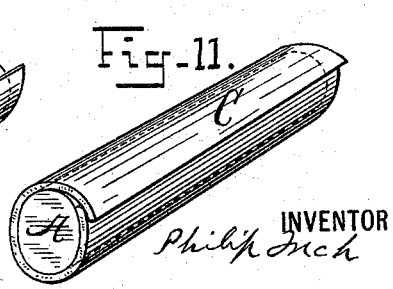
WITNESSES:
Chas. Hanimann
Henry N. Brown.
INVENTOR
Philip Inch
BY
D. Walter Brown
ATTORNEY

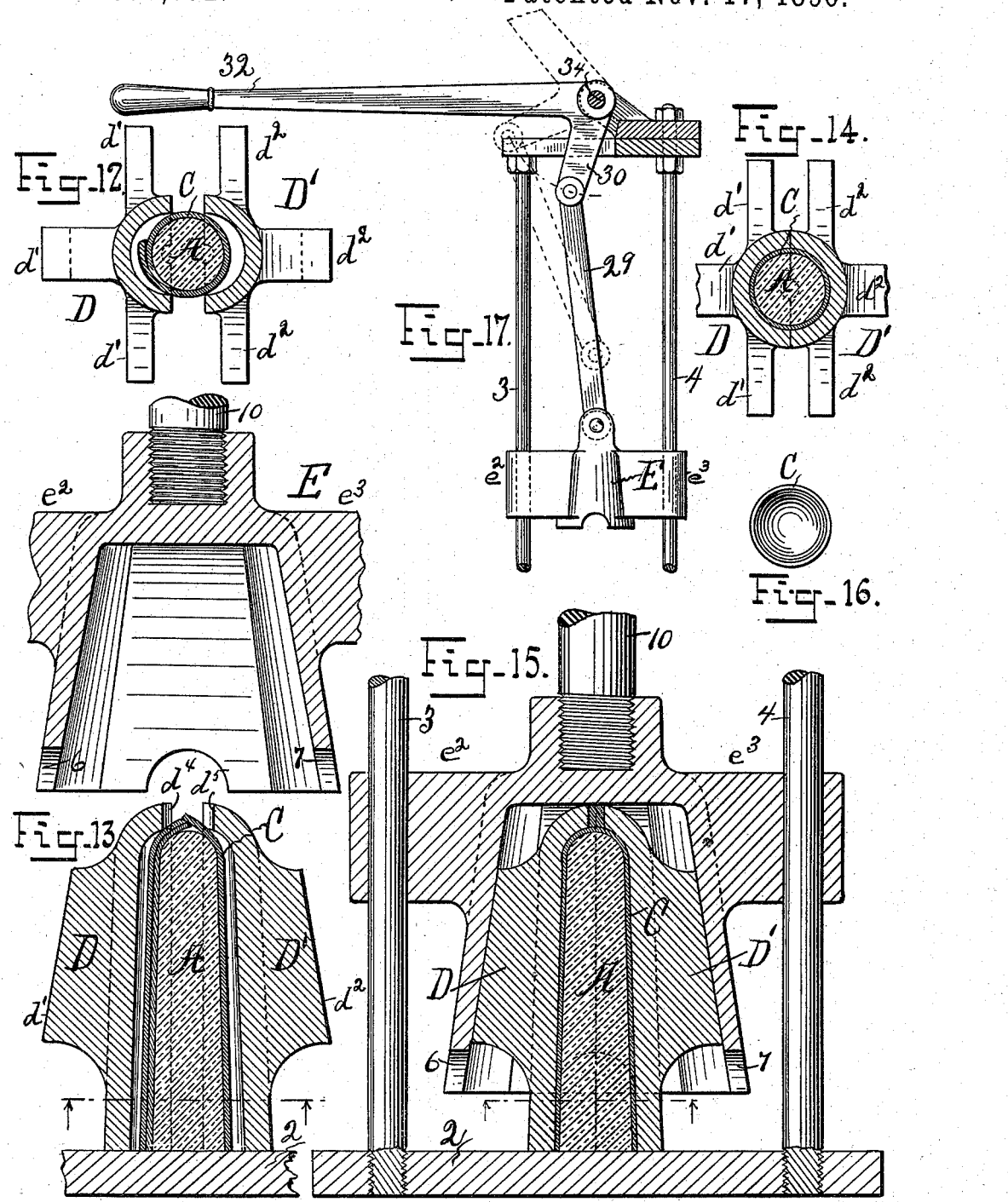

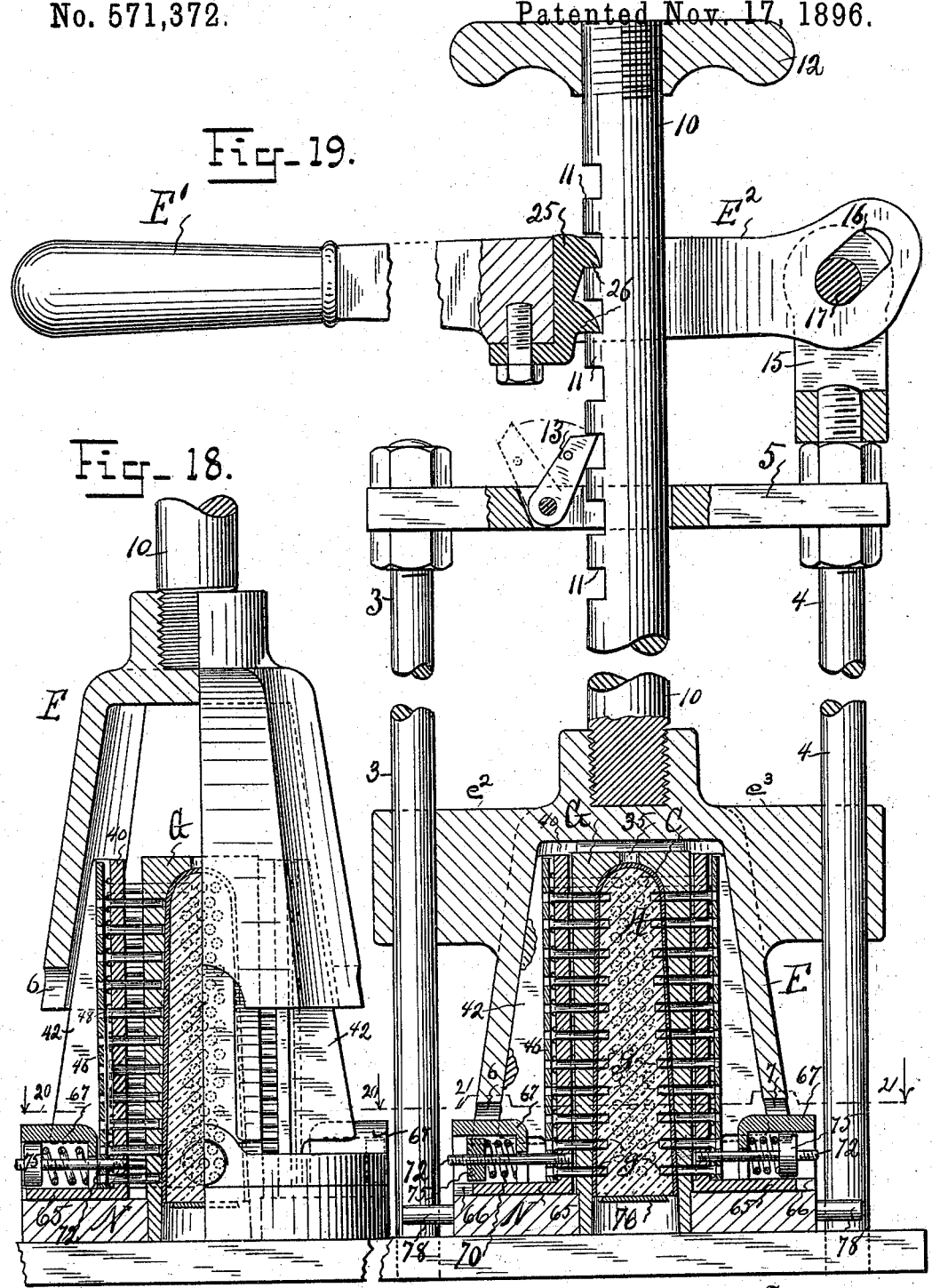

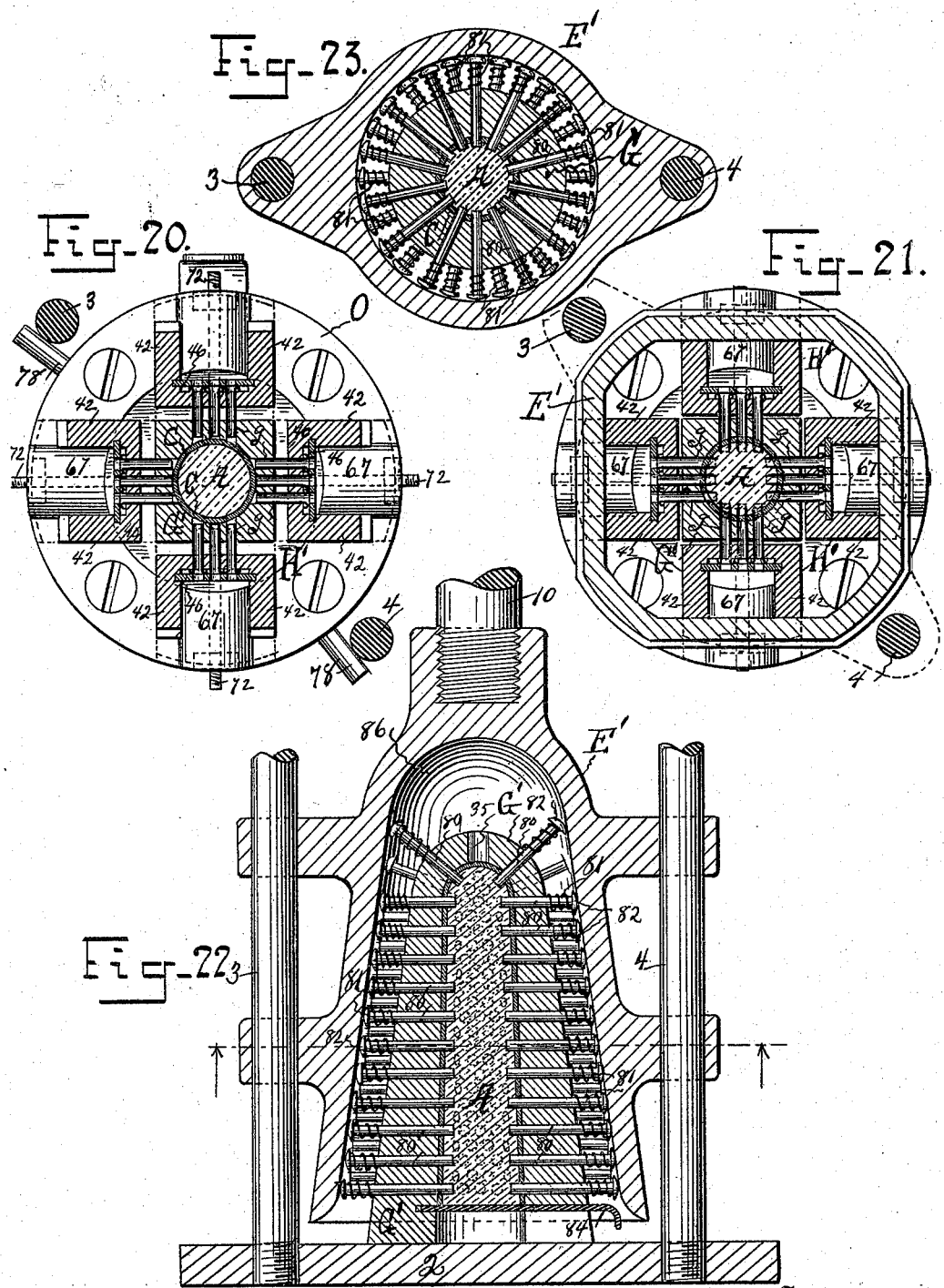

(No Model.) 5 Sheets—Sheet 5.
P. INCH.
PROCESS OF AND MACHINE FOR MAKING MANTLES OR HOODS FOR INCANDESCENT GAS LIGHTS.
No. 571,372. Patented Nov. 17, 1896.
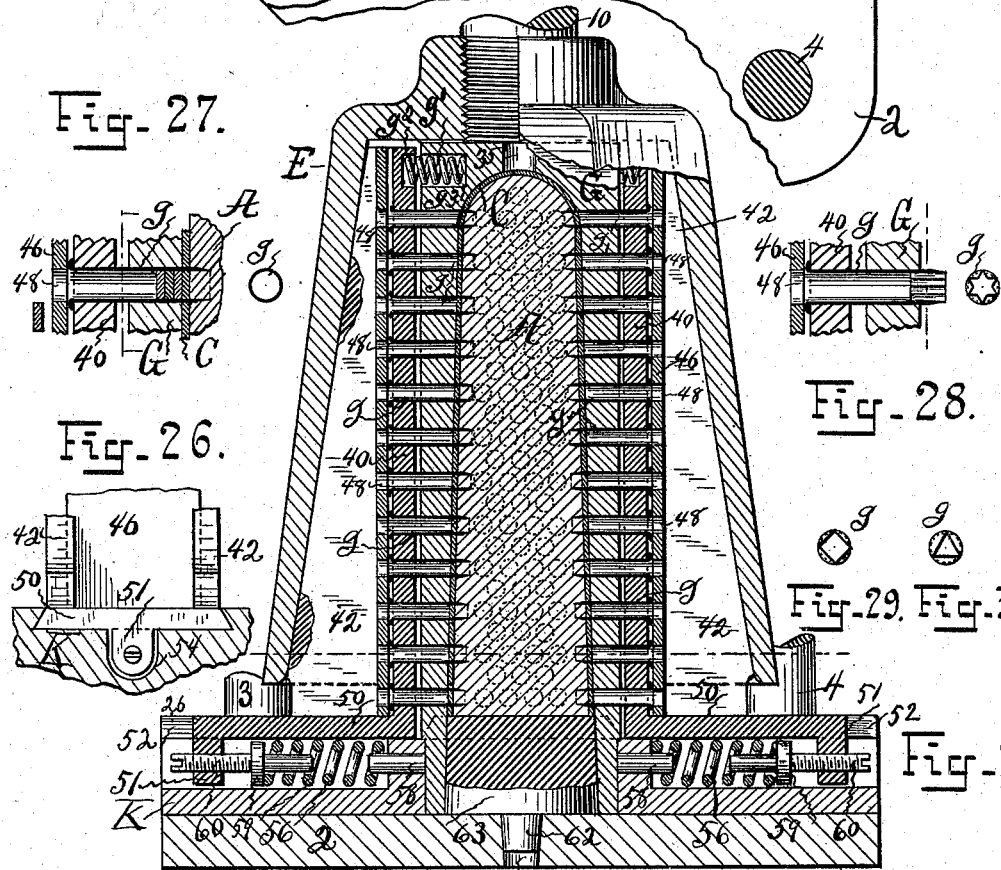

UNITED STATES PATENT OFFICE.

PHILIP INCH, OF WASHINGTON, DISTRICT OF COLUMBIA, ASSIGNOR, BY MESNE ASSIGNMENTS, TO THE CONSOLIDATED STERLING INCANDESCENT GAS LAMP COMPANY, OF NEW JERSEY.

PROCESS OF AND MACHINE FOR MAKING MANTLES OR HOODS FOR INCANDESCENT GAS-LIGHTS.

SPECIFICATION forming part of Letters Patent No. 571,372, dated November 17, 1896.

Application filed February 19, 1896. Serial No. 579,886. (No model.)

*To all whom it may concern:*

Be it known that I, PHILIP INCH, a citizen of the United States, and a resident of the city of Washington, in the District of Columbia, have invented certain new and useful Improvements in Processes of and Machines for Making Mantles or Hoods for Incandescent Gas-Lights, of which the following is a specification.

My invention relates to improvements in a process for making mantles or hoods for incandescent gas-lights and in machines for operating the process.

Especially the invention relates to the process and the machine therefor, which process consists in first making a core of the size and shape of the mantle or hood and of a somewhat yielding material, such as paraffin-wax; next reducing the materials of which the mantle or hood is to be composed to the form of a thin sheet, and which is herein termed the "wrapper;" next wrapping the sheet or wrapper on the core and uniting the meeting edges; next placing the core and wrapper in a machine wherein cutters perforate the wrapper, the core allowing the cutters to pass clear through the wrapper and into the core, so as to make a clean hole through the wrapper, and finally melting out the core and leaving the perforated mantle or hood ready to be put on a suitable burner and oxidized in the usual manner.

Referring to the drawings which accompany the specification to aid the description, Figure 1 is a vertical section of a finished mantle, and Fig. 2 a cross-section of the same. Fig. 3 is a vertical section of a finished mantle with perforations arranged in a somewhat different manner, and Fig. 4 is a cross-section of the same. Fig. 4ª is a vertical section of the core. Fig. 5 is a vertical section of the mold for making the core closed, and Fig. 6 is a bottom view of the same. Fig. 7 is a vertical section of the mold open and showing a liner which can be used for making smaller cores. Fig. 8 is a broken section, and Fig. 9 a broken plan, on a small scale, of blocks containing numerous core-molds. Fig. 10 is a perspective view of a wrapper just being applied to the core, and Fig. 11 shows the wrapper wrapped around the core. The core is usually somewhat more tapering than it appears in these views. Fig. 12 is a cross-section, and Fig. 13 a vertical section, of the core and wrapper in a mold before being compressed; and Fig. 14 is a cross-section, and Fig. 15 a vertical section, of the mold closed on the article to unite the edges of the wrapper, Fig. 16 being a plan view of the core and wrapper after compression. Fig. 17 is an elevation on smaller scale of one arrangement for operating the "former" or outer member of the mold. Fig. 18 is a section and elevation of the apparatus for perforating the wrapper and before the perforations are made, and Fig. 19 is a vertical section of the apparatus after it has perforated the wrapper. This figure shows a modification of the arrangement for operating the former, Fig. 20 being a cross-section on the line 20 20 of Fig. 18, and Fig. 21 being a cross-section on the line 21 21 of Fig. 19. Fig. 22 is a vertical and Fig. 23 a cross section of an apparatus which has radial cutters. Fig. 24 is a vertical and Fig. 25 a cross section, on a large scale, of an apparatus, showing some modifications over that shown in Figs. 18 to 21. Fig. 26 is a broken sectional elevation on the line 26 26 of Fig. 24. Figs. 27, 28, 29, and 30 are details of various forms of cutters for making the perforations.

Cores A of a suitable material, such as paraffin-wax, are formed in a suitable mold, such as the two-part mold B B'. Said molds may be held, while the core is being cast, in holes in a plate B², flanges *b* supporting the parts B B' in position. The mold is made in two parts to facilitate removing the core. The molds may also be formed in two plates or bars B⁴ B⁵, Figs. 8 and 9, the parts being held together during casting in any suitable manner. Liners 1 of sheet metal, Fig. 7, may be placed inside the molds, so as to cast cores of smaller sizes. These liners 1 are preferably made in two parts.

After the core A has been formed a thin sheet or wrapper C of the material for making the mantle, having been first cut to the proper shape, is wrapped around the core A with its edges overlapping a little, Fig. 11. Said sheet C is composed of any suitable materials, such as camphor, gun-cotton, and one or more of the oxids of the alkaline earths or earths proper. Such a material is described in an application for United States Letters Patent filed October 14, 1895, Serial No. 565,682. The edges of the sheet C may be moistened and softened by a suitable agent, such as oil of cassia, to facilitate the uniting of the edges. Next the core and wrapper are placed in a compressor, which is formed of two parts D D', and pressed by the former E, Fig. 15, in the manner hereinafter particularly described. This operation shapes the wrapper C to the core and cements the edges of said wrapper firmly together. Next the core with the wrapper is placed in the "perforator," the preferred form of which is shown in Figs. 24 and 25, and the wrapper is perforated with many openings near together, whereby it is rendered suitable to be used as a mantle for an incandescent gas-light, the mass of material exposed to the gas-flame being reduced in proportion to the perforations. The construction of the perforator will be hereinafter particularly described. After being perforated the wrapper C with the core A is removed from the perforator and the core A is melted out, leaving the finished hood exhibited in Figs. 1 and 3.

*The compressor.*—Referring to Figs. 12 to 17, D D' are blocks, each containing a cavity resembling in shape one-half of the finished mantle. Usually this shape is a frustum of a cone with a rounded top, Fig. 15. $d'$ $d^2$ are wings on the outside of the blocks D D' and flaring downwardly and outwardly, as shown. Each block D and D' may have a half-hole $d^4$ $d^5$ in its upper end, arranged to form a round opening when the blocks are closed together. Said blocks D D', the core and wrapper being placed in them, Fig. 13, are set on the base-plate 2 in position to be embraced by the former E when the same descends. Said former E is a pyramidal frustum having the same taper as the wings $d'$ $d^2$ of the blocks D D' and provided with perforated lugs $e^2$ $e^3$, which work on guides 3 4, fixed on the base-plate 2. At diametrically opposite points said former E may be provided with half-round notches 6 7 in its lower edge to fit over certain parts of the perforator, as will be hereinafter explained. 10 is a rod fixed in the top of the former E and provided with rack-teeth or notches 11 11 and a handle 12. A dog 13, pivoted to the cross-bar 5, can be thrown into the said teeth to sustain the former E in any position or can be thrown back out of the teeth to allow the said former to descend, Fig. 19. A lever E', formed with a yoke $E^2$, which spans the rod 10, has a slot-and-pin pivotal connection with a block 15, fixed on the upper part of the frame of the apparatus, as on the end of standard 4. A toothed plate or bar 25 is secured to the jaw of the yoke, the teeth 26 being arranged to engage when desired with the teeth 11 of the bar 10.

The compressor operates as follows: The core A and wrapper C are placed in the cavity of the blocks D D', said cavity being a little smaller than the core and wrapper, (the former E being raised,) and the blocks are set on the base-plate 2 directly under the said former. Now, the dog 13 being thrown back, the rod 10 is lowered quickly by hand until the former E comes on the blocks D D'. Then the lever E' is pushed forward, so that the teeth 26 engage the teeth 11, and then the lever is pushed hard down, forcing the former E downward over the blocks D D', and thereby pushing the said blocks together with great force, compressing the wrapper C hard upon the core A, shaping said wrapper C and causing its lapped edges to unite firmly and smoothly. Next the lever is drawn back, disengaging the teeth 26 from the teeth 11, and then the former E is raised by the handle 12 and held up by the dog 13, permitting the blocks D D' to be removed.

The arrangement of the lever E' as described provides very quick and powerful action. A modification is shown in Fig. 17, wherein the former E is connected by the connecting-rod 29 with the short arm 30 of bent lever 32, pivoted to the frame at 34. Of course a long screw-thread on the rod 10, working in a nut in the frame, could be employed, but its operation is slow.

In order that former E may be used with the perforating device, the outside edges of the wings $d'$ $d^2$ are plane surfaces at right angles to the wings, and this form also gives a true bearing at all positions of the former E.

*The perforator.*—The parts of the apparatus thus far described press the wrapper on the core, but the completed machine includes the parts for perforating the wrapper, and which parts I term the "perforator." In the preferred form thereof, Figs. 24 and 25, G is a block containing a chamber fitted accurately to the shape of the mantle, and preferably formed as a square in its external cross-sections. 35 is a hole in the top to facilitate pushing out the wrapper and core. Each side of block G is perforated with numerous cylindrical holes, through which easily work the hollow cutters $g$ $g$. All the holes through the same side are parallel to each other, and I prefer to group said holes in staggered rows, as indicated by dotted lines in Fig. 24. Said cutters $g$ $g$ are snugly fitted at their outer ends in holes in the inner walls 40 of the slides or quadrants H H, and so as to be accurately in line with their respective holes in the block G. The outer ends of said cutters are expanded or flanged over the walls 40. Each quadrant H is provided with wings 42 42, the outer edges of which flare downwardly and outwardly, Fig. 24. Vertical guide-slots 45 are made in said wings 42, and plates 46 are inserted therein just behind the cutters $g$ $g$. Said plates 46 have holes 48 in line with said cutters $g$ $g$ to permit the bits of material which are cut from the wrappers and cores to pass out and fall down the space between said wings 42. Said holes 48 being smaller than the flanged heads of the cutters, said plates 46 keep the cutters in place, and also provide an easy way of removing any cutter. 50 50 are plates on the bottom of the quadrants H H, and 51 51 are flanges on the outer ends thereof. The edges of plates 50 50 are beveled, and said plates work in beveled recesses 52 in the base-plate K, the flanges 51 working in channels 54. Springs 56, positioned between guide-pins 58 and shoulders 59 of threaded pins 60, push the quadrants H H outward after the former E has pushed them inward. The base-plate K rests on the sub-base or bench 2, which carries the aforesaid standards 3 4 of the frame which guides the former E, and in order that the perforations shall extend as near as possible to the lower edge of the mantle I prefer to provide a hole 64 in said bench 2 to receive the spud 62 of a taper-plug 63, which fits nicely in the lower end of the block G and almost up to the lowest row of cutters. The apparatus is so arranged that the remaining space in the chamber of the block G is of the right size for the mantle.

The operation is as follows: The former E being raised by the handle 12, Fig. 19, and the cutters $g$ being retracted, as shown in Fig. 18, the wrapper C on the core A is placed in the chamber in the block G, plug 63 is put in its hole in the bench 2, and the apparatus lowered, so that said plug enters the said chamber, pushing the core and wrapper up to their proper position. Now the former E is lowered and pressed by the lever E', as hereinbefore described, forcing the quadrants H H, with their cutters $g\ g$, inward, and thereby pushing said cutters clean through the wrapper C into the core A. The former E is now raised, the springs 56 forcing the quadrants H H outward and retracting the cutters from the wrapper C. Now the apparatus is lifted off the bench, the wrapper and core pushed out by an instrument inserted through the hole 35, and the mantle is ready for the melting out of the cores.

To prevent the liability of binding of the quadrants H H or cutters $g$, springs $g'$ may be placed in recesses $g^3\ g^3$ in the upper parts, respectively, of the quadrants H H and block G.

The apparatus shown in Figs. 18 to 21 is in essential respects like that just described, but the plates 65 65 on the bottom of the quadrants or slides H' H' now work in grooves 66 in the base N, and said base N is provided with an annular top plate O, which has boxes 67 positioned between the wings 42 42 of said quadrants H', as shown. Said boxes are chambered to receive springs 70, coiled around pins 72, that are fixed in the quadrants, 75 being plates threading on pins 72 to vary the tension of the springs. A slide 76, working in a suitable slot in the base-plate N, is positioned to support the core A and wrapper C, as shown. Pins 78 78 may be fixed in the plate N to aid in determining its proper position under the former E.

As will appear from Figs. 20, 21, and 25 I prefer to make the former E a polygon in cross-section, so that it shall bear truly on the wings 42 during the whole inward movement of the quadrants. In cross-section the cutters $g$ may be of a variety of shapes, as indicated on the detailed views, Figs. 27 to 30, inclusive.

The essential feature of the apparatus being such an arrangement of parts that a plurality of cutters shall be forced through the wrapper, which forms the mantle proper, into a somewhat yielding core, I show in Figs. 22 and 23 a modification wherein the cutters move radially. The stationary block G', chambered on the inside to nicely fit over the wrapper C and core A, has numerous radial through-and-through holes, through each of which works a cutter 80. Springs 81, coiled around said cutters and bearing on the heads 82, retract the cutters after they have been pushed in. A slide 84, working in guide-slots in the block G', supports the wrapper and core. The chamber 86 in the former E' is now made as a true frustum of a cone instead of a pyramid. Said former E' is actuated as in Fig. 19 or in any other suitable manner. Plainly, as the said former descends over the block G' all the cutters 80 will be pushed in simultaneously, since they are normally positioned with their heads 82 all arranged on the surface of a cone having the same shape as the chamber 86 of the former E'. Said cutters 80 are shown as solid pins, which may have concave cutting ends, or said pins may be hollow, as before.

The yielding fusible core A is employed in all modifications of the machine and offers a means of safely packing and shipping the mantles, since the cores can be left in the mantles at the factory and only melted out when the mantles are used.

Now, having described my improvements, I claim as my invention—

1. The process of making mantles or hoods for incandescent gas-lights, consisting in first forming a core of a yielding fusible substance, wrapping a sheet of material suitable for incandescence on the core, perforating said sheet while on the core, and finally melting out the core, substantially as described.

2. The combination in a machine for making mantles or hoods for incandescent gas-lights, of movable cutters, slides carrying the cutters, a former adapted to move over the slides and press the slides inward, means for depressing the former, and a chambered block adapted to contain the mantle arranged within the slides and provided with guiding-holes for the cutters, substantially as described.

3. The combination in a machine for making mantles or hoods for incandescent gas-lights, of movable cutters, slides carrying the cutters and provided with flaring bearing-surfaces, a hollow former adapted to descend over said slides and force the same inward, and a chambered block arranged within said slides and provided with guiding-holes for said cutters, substantially as described.

4. The combination in a machine for making mantles or hoods for incandescent gas-lights, of movable cutters, slides carrying the cutters, a former adapted to move the slides inward, springs adapted to retract the slides, and a chambered block within the slides provided with guiding-holes for the cutters.

5. In a machine for making mantles or hoods for incandescent gas-lights, the combination with the chambered guiding-block G, of a plug adapted to enter the said block and sustain the mantle in proper position, substantially as described.

6. The combination in a machine for making mantles or hoods for incandescent gas-lights, of hollow movable cutters, slides carrying said cutters and chambered behind the same, and plates adapted to retain said cutters in the slides and perforated in line with the cutters, substantially as described.

7. The combination in a machine for making mantles or hoods for incandescent gas-lights, of a former E, a lever for depressing the same, slides adapted to be pressed inward by said former E, cutters on said slides, and a chambered block within the slides provided with holes for the cutters, substantially as described.

8. As a new product a core A of yielding fusible material, and a perforated wrapper of material suitable for incandescence thereon, substantially as described.

In testimony that I claim the foregoing as my invention I have signed my name, in presence of two witnesses, this 14th day of February, 1896.

PHILIP INCH.

Witnesses:
JAMES A. DILLON,
T. BLAKE BROOKE.